S. C. COX.
FEEDING MECHANISM FOR ADDRESSING AND OTHER MACHINES.
APPLICATION FILED FEB. 29, 1904.

1,033,232.

Patented July 23, 1912.
8 SHEETS—SHEET 3.

S. C. COX.
FEEDING MECHANISM FOR ADDRESSING AND OTHER MACHINES.
APPLICATION FILED FEB. 29, 1904.

1,033,232.

Patented July 23, 1912.
8 SHEETS—SHEET 7.

UNITED STATES PATENT OFFICE.

SANDFORD C. COX, OF CHICAGO, ILLINOIS, ASSIGNOR, BY MESNE ASSIGNMENTS, TO COX MULTI-MAILER COMPANY, OF AUGUSTA, MAINE, A CORPORATION OF MAINE.

FEEDING MECHANISM FOR ADDRESSING AND OTHER MACHINES.

1,033,232. Specification of Letters Patent. Patented July 23, 1912.

Application filed February 29, 1904. Serial No. 195,869.

*To all whom it may concern:*

Be it known that I, SANDFORD C. COX, a citizen of the United States, residing at Chicago, in the county of Cook and State of Illinois, have invented certain new and useful Improvements in Feeding Mechanism for Addressing and other Machines, of which the following is a full, clear, and exact specification.
This invention relates to mechanism for feeding papers to addressing machines and the like, and has for its object to provide a simple and efficient automatic mechanism for such purpose.
With this end in view this invention consists in certain features of novelty in substantially the construction, combination and arrangement of parts by which the said objects and certain other subsidiary objects hereinafter appearing are attained, all as fully described with reference to the accompanying drawings and more particularly pointed out in the claims.

In the said drawings,
Figure 1 is a side elevation of an addressing machine embodying this invention.
Fig. 1ª is a detail section of the sucker valve.

Generally speaking, in the operation of a machine of this class, the papers to be addressed are preferably folded one or more times and placed in a hopper or feed-trough, from which they are gradually fed by a follower board to the outlet end of such hopper, the movement of the follower being regulated or governed in proportion to the rate of speed at which the papers are removed from the end of the hopper by suitable pushers, or other means, and which pushers act to force the outermost paper in between conveyer tapes after such paper has been pulled outwardly by a pneumatic sucker, or other equivalent means, while the main supply under the outermost paper is held in place by means of a gate or stop vibrating alternately with the movement of the sucker; and while between the tapes the paper is arrested by suitable stops or gages which position it with relation to a trip or slug-holder, while a stamper or platen impresses the paper against the type surface, after which the tapes continue the travel of the paper to a suitable receiver where the papers are deposited on edge in regular order and suitable markers are inserted between the papers where desired for separating one batch of papers from another by automatic mechanism working in harmony with the printing mechanism.

The slugs bearing the addresses are contained in a race or galley which is provided with means for yieldingly urging the slugs forward to the end of the galley, where they are taken off one at a time and deposited in the slug-holder or wheel, and after they are printed from they are automatically ejected from the slug-holder or wheel into a receiving galley, which stores them in their regular order. The present invention, however, is limited more particularly to the mechanism for feeding and controlling the feeding of the papers.

Figure 6:
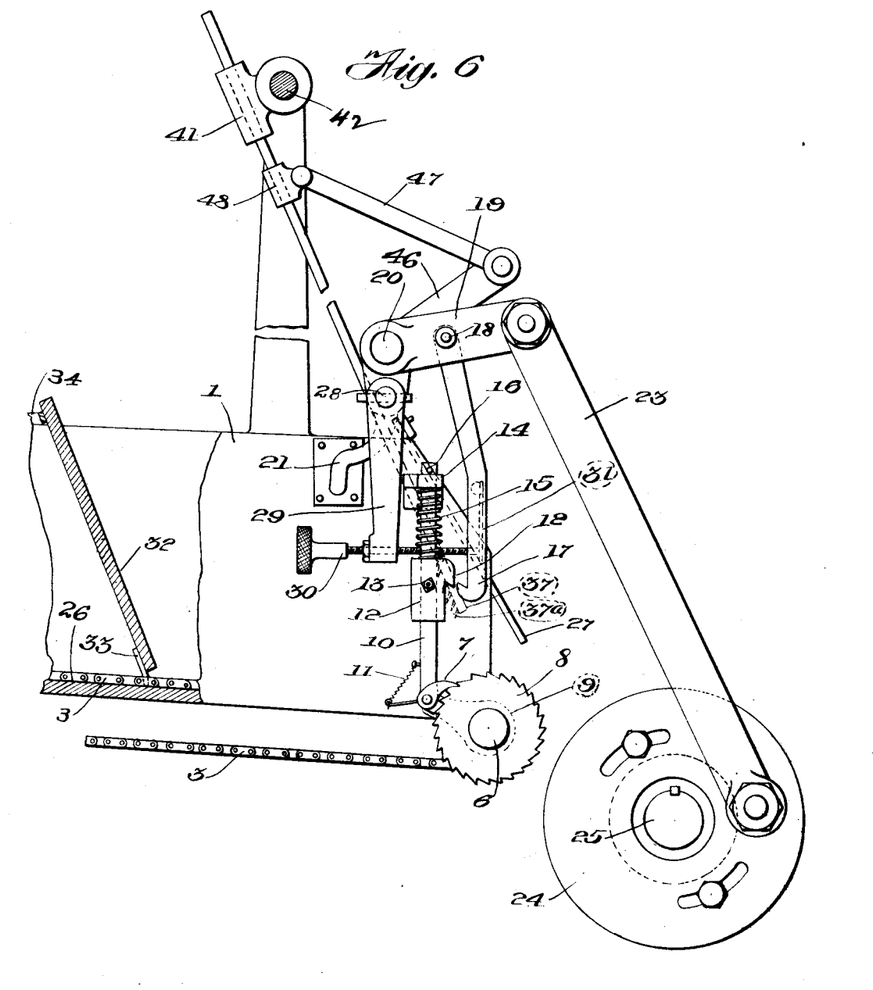
Fig. 6 is a detail side elevation of the mechanism for feeding the papers from the hopper to the conveyer tapes, a portion of the hopper being shown in vertical section.

In the drawings 1 designates the hopper or feed-trough in which the papers shown at 2 are preferably placed on edge and slightly at an incline with relation to the bottom of the hopper 1, and the hopper 1 is also preferably inclined. The lower end of the hopper 1 is open and the bottom of the hopper is provided with a number of belts, preferably composed of chains 3, which run over suitable idlers 4, 5, the latter of which are on a driven shaft 6, which derives motion from a pawl 7 engaging a ratchet 8 secured to said shaft 6, see Fig. 6. The pawl 7 is pivoted to an arm 9 loosely journaled on the shaft 6 and connected to the lower end of a rod 10, the pawl being held in engagement with the teeth of the ratchet by a suitable spring 11, and this rod 10 is provided with a lug or hook 12 adjustably secured thereto by set screw 13, and the upper end of the rod passes through a guide or keeper 14 secured to the side of the hopper 1, a coil spring or other suitable means 15 being interposed between lug 12 and guide 14 for normally depressing lug 12 and rod 10, and thereby returning pawl 7 to the limit of its backward movement, this movement being limited by stop pin 16 on rod 10 engaging the upper side of guide 14.

Figure 4:
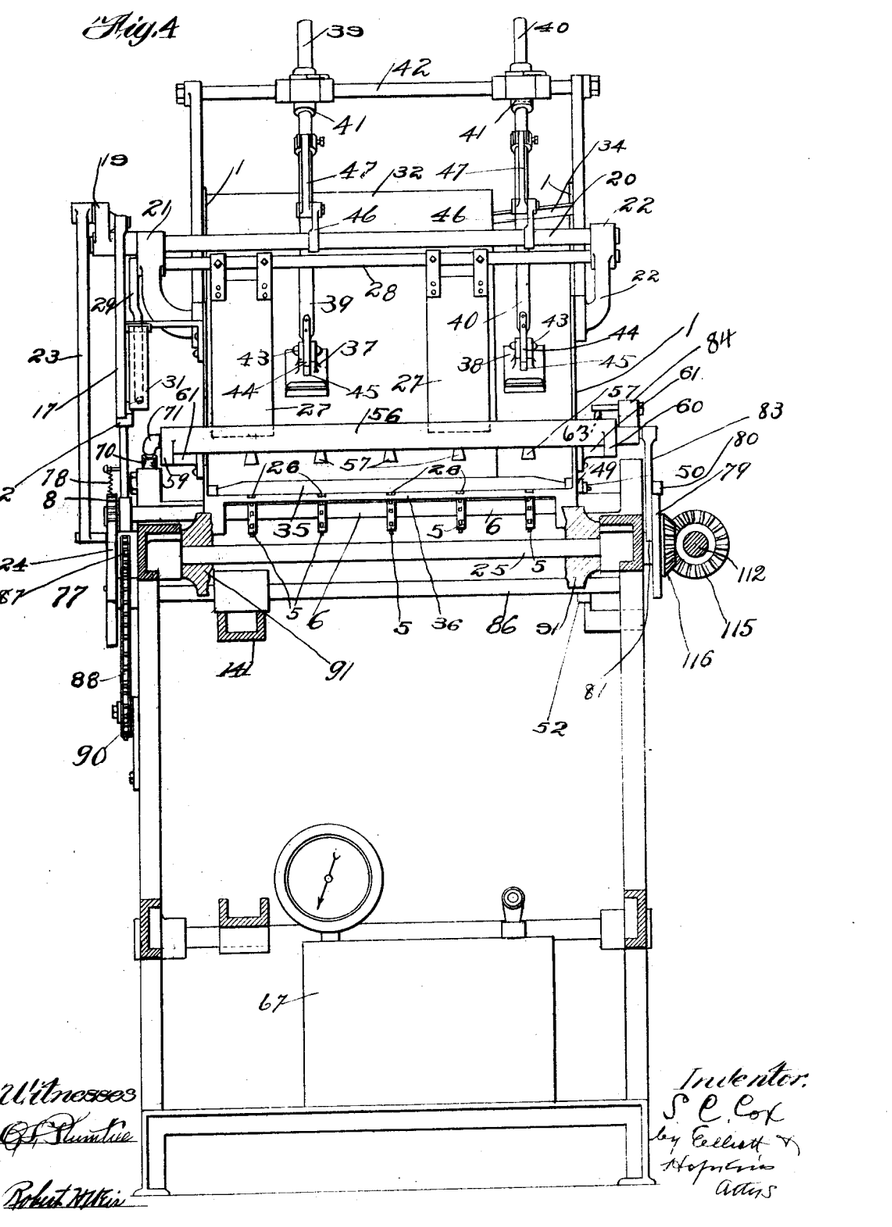
Fig. 4 is a vertical cross section taken on line 4—4, Fig. 2.

Depending near the hook or lug 12 is a hook 17 which swings from a pivot 18 on a rocker arm or lever 19 secured to a rocker shaft 20 journaled in brackets 21, 22, and extending across the hopper 1. (See also Fig. 4.) The arm 19 is connected by a pitman 23 with a crank disk 24 secured to a shaft 25, which is driven by mechanism on the opposite side of the machine, as will be presently described. Thus it will be seen that as the crank 24 revolves the hook 17 will be raised and lowered, and should it at this time be in engagement or line with the lug 12, intermittent rotation would be imparted to the shaft 6 and consequent intermittent travel to the chain belts 3, thereby feeding the papers downwardly in the hopper 1 by frictional contact with their lower edges which rest upon said chains as the latter run in guide grooves 26 in the bottom of the hopper. Mechanism is provided, however, for holding the hook 17 out of line with the lug 12 at all times excepting when the papers are not sufficiently advanced in the hopper 1 to enable the other mechanisms, which will be presently described, to engage and remove them one by one. The means for thus controlling the action of the hook 17 preferably consists of one or more gages 27, see Figs. 4 and 6, rigidly secured to a transverse rocker shaft 28 mounted in the brackets 21, 22, and so positioned that they will be engaged by the outermost one of the papers as the latter advance to the lower or outlet end of the hopper; and this shaft 28 is provided at one end with a depending arm 29 which carries means for engaging the hook 17 and holding it out of contact when the papers press the gages 27 outwardly beyond a certain point. This means on the arm 29 preferably consists of an adjustable screw 30 threaded therein and having its end arranged to engage a spring tongue 31 secured to the inner side of the hook 17, the tongue 31 being a convenient means of giving the hook operative connection with the screw without resulting in undue wear and objectionable noise on the hook, and the object of the screw being to adjust the relation between the hook and gages 27 so that the time of engagement and disengagement between the hook and the lug 12 may be varied to suit the requirements. The papers are held in the described inclined position in hopper 1 by means of a follower 32 whose lower end is provided with hooks or lugs 33 adapted to be engaged between the links of the chains 3, so that the follower 32 will be compelled to advance with the papers and also assist in their feeding movement.

It is found that the best way to arrange the papers and feed them from the hopper 1 is to turn them folded edges downward, but this brings the doubled edge at one side of the hopper and the single edges of the sheets at the other side, and consequently one side of the series or supply of papers is longer lengthwise of the hopper than the other side owing to the multiplication of these doubled edges which are, of course, thicker than the edges that are not doubled and lie close together. Consequently, if the follower 32 be so constructed as to hold the doubled end or edge of the last paper in the series as far forward as the opposite end or edge thereof, the compression at one side of the supply would be so much greater than that at the other side of the supply as to cause the papers to clog in the mechanism provided for removing them from the hopper; or, on the other hand, should the feed mechanism, comprising the adjustable gages 27 be so adjusted as to avoid undue pressure at the doubled side of the supply, the single side would not be fed sufficiently far forward to enable the mechanism for removing the papers from the hopper to operate properly on their side of the supply. In order to meet both of these difficulties and feed the papers forward with uniform pressure throughout their entire surface, the follower 32 is so constructed that it does not advance as far on one side as it does on the other, or, in short, the side opposite the doubled ends or edges of the papers is cut away from top to bottom, as shown more clearly in Fig. 3, and this side is supported by an arm 34 bent backwardly and resting upon the side wall of the hopper 1 so that it does not compress the doubled ends of the papers unduly, while at the same time it serves in a sufficient degree to prevent that side of the supply of papers from lagging behind at the top, the bottom or lower edges being urged forward by the chains 3. As the papers are thus pushed forward by the conjoint action of the chains 3 and the follower 32 they come against a stop or gate 35 which is journaled in suitable bearings in an extension 36 of the bottom of the hopper and extends entirely across such bottom, see Figs. 4 and 7, and it is in the form of a flat blade so as to rest against the supply of papers and hold them in place against the frictional action of the chains 3 and the movement of the follower 32 until the movement of these members 3 and 32 is discontinued through the action of the gages 27 throwing the hook 17 out of line with the lug 12. When the papers thus come to rest against the gate 35 they are in accurate and proper position to be engaged and removed by one or more pushers, preferably two, one on each side, in the form of needle blocks 37, 38, secured to the lower ends of rods 39, 40, respectively, whose upper ends slide in guides 41 rotatably mounted on a cross rod or shaft 42, so that the rods 39, 40 may oscillate to enable the pushers 37, 38 to adapt themselves to the face of the outermost paper. These pushers are connected to their respective rods 39, 40 by pivots 43, (see Fig. 4) and are pressed normally into engagement with the surface of the outermost paper in any suitable way, as by frictional engagement of the pivotal members, or, if desired, by springs 44, the upper end of each of which is secured to one of the rods 39, 40, and bears at its lower end against the back of the block.

Figure 7:
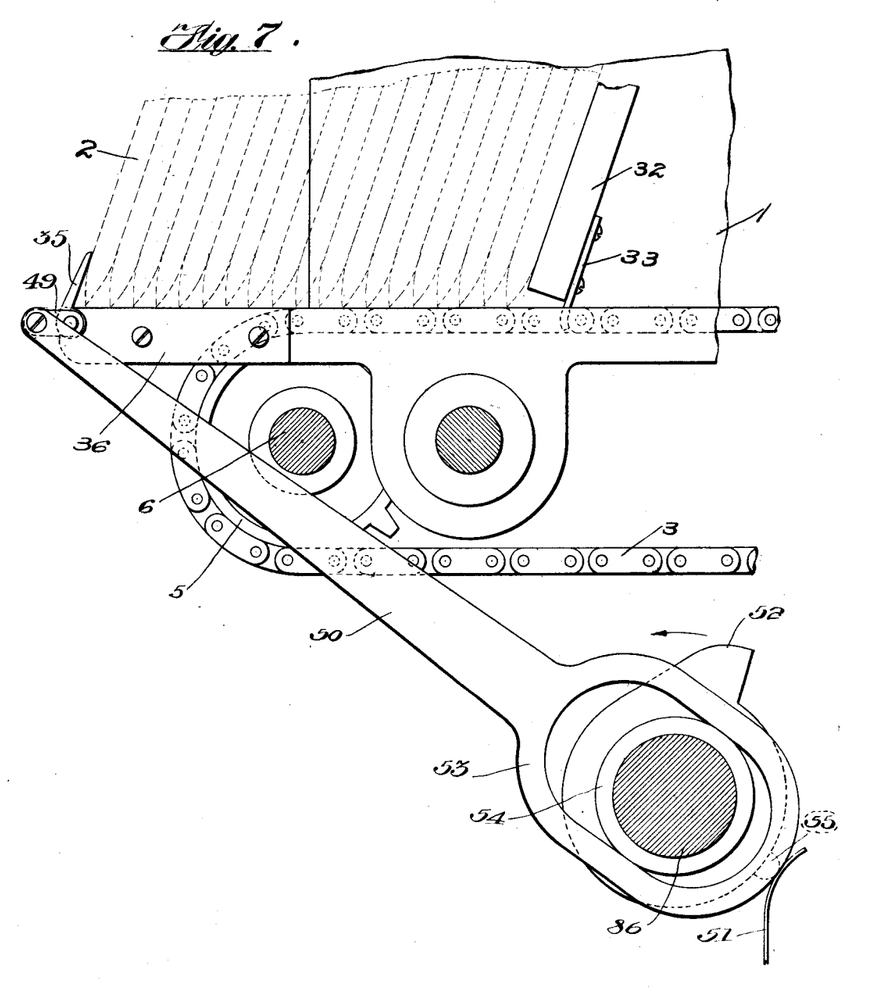
Fig. 7 is an enlarged detail view of a gate or stop for the papers, hereinafter described, shown in side elevation and partly in vertical section.
Figure 8:
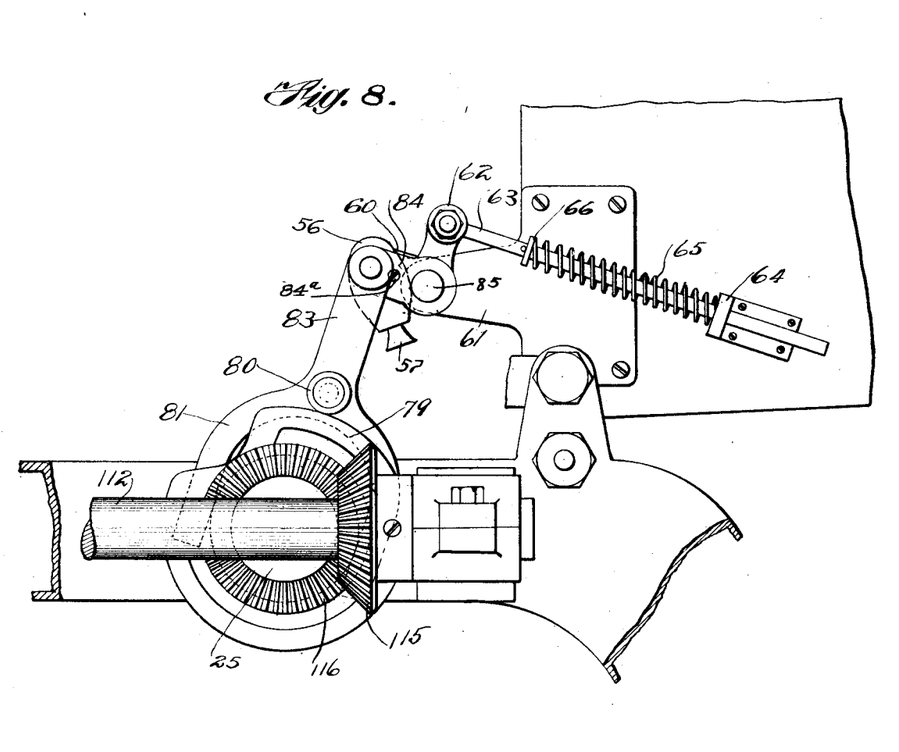
Fig. 8 is an enlarged detail view of the sucker-bar and actuating mechanism shown in side elevation.

When it is desired to stop the operation of the pushers 37, 38 on the paper they may be turned upwardly on their hinges 43 and when in such position the springs 44, the lower ends of which are bent at an angle as shown at 45, engage over the lower edge of the block to hold it in this disengaged position. The rods 39, 40 are given a reciprocating movement for causing the needle blocks or pushers 37, 38 to move up and down across the face of the paper, by means of the rocker shaft 20 which derives its motion from the crank 24, as before explained, and which is provided with a pair of rocker arms 46 connected by links 47 with the rods 39, 40 in any suitable way, as by means of collars or clamps 48 to which the upper ends of the links 47 are pivoted. Thus it will be seen that at each revolution of the crank 24 the two needle blocks or pushers 37, 38 will be raised and lowered. When they rise or move upwardly their needles will pass over the paper without tearing or puncturing it by virtue of the downward inclination of the needles, as appears at 37ª in Fig. 6, but when they descend this inclination of the needles causes them to dig into the outermost one of the papers and push it downwardly providing at that instant the gate 35 is removed to permit the lower edge of the paper to pass. In order that this operation of the gate 35 may be accomplished at the proper time, one end of the gate is provided with a crank arm 49 which is pivoted to the upper end of a rod 50 whose lower end is engaged by a spring 51, or other suitable means, acting normally to push the rod upwardly and hold the gate 35 closed against the supply of papers, as shown in Fig. 7, and the lower end of the rod 50 is also engaged by a cam 52 for moving the rod in the opposite direction against the action of spring 51 and thereby opening gate 35 at the proper time to permit the lower edge of the outermost paper to pass. The lower end of the rod 50 is shown as provided with a yoke 53 embracing hub 54 of the cam 52 as a means of holding the end of the rod in position and one side of the yoke 53 is provided with a lug 55 arranged in the same vertical plane as the cam 52 and adapted to be engaged thereby. The cam 52 is so formed that it will allow the gate 35 to remain closed for a little more than one-half the revolution of the cam, when it rapidly opens the gate and permits spring 51 to suddenly close it, the parts being properly timed with relation to the operation of crank 24, so that the pushers 37, 38 will begin their downward movement by the time the abrupt enlargement of the cam 52 engages the lug 55 and the gate is fully open; but in order that the lower edge of the paper may be removed out of the path of the gate 35 to permit the gate to close in due time against the remaining supply of papers and also to avoid the possibility of the paper being forced downwardly against the open gate, a suitable means is provided for taking possession of the lower edge of the outermost paper after the gate 35 opens and holding it aloof from the gate, whereby the gate may close against the next paper and thus permit the outermost paper to be pushed downwardly without the possibility of any interference. As a means for accomplishing this a suitable pneumatic sucker is employed and adapted and arranged to act in harmony with the movement of the gate 35. This sucker mechanism is in the form of a hollow bar 56 (see Figs. 4 and 8) provided on its under side with a number of suckers 57 adapted to engage the lower edge of the outermost paper to bend the same backward in an arc toward the upper or free end of the paper without bending the entire body portion of the paper and hold said edge aloof in the manner shown at 58 in Fig. 5 when the bar 56 is elevated or pulled outwardly, and to the end that the bar may be thus actuated it is formed on or secured to two crank arms 59, 60, pivoted to the sides of hopper 1 on suitable brackets 61 and the crank arm 60 is in the form of a bell crank with an additional arm 62 to which is pivoted one end of a rod 63 passing through a guide 64 and supporting a coil spring 65 which acts between the guide 64 and the shoulder 66 on rod 63 for throwing the sucker bar 56 downwardly with its suckers 57 against the paper at a time preferably before the pushers 37, 38 begin to act on the paper. With such an arrangement, the body portion of the outermost paper will hold the remaining papers in the hopper and serves to prevent the next adjacent paper from slipping or becoming dislocated when the outermost paper is removed and while the gate 35 is moving into position to engage the lower edge of the paper adjacent the one being removed. When the sucker bar is lowered communication is established between it and any suitable source of suction, such as a tank 67 from which the air has been exhausted by any suitable exhaust pump, or other means, 68, connected with the tank by pipe 69. This communication between bar 56 and tank 67 is established through a flexible tube 70 secured to a nipple 71 on one end of bar 56 and to a valve housing 72 (see particularly Fig. 1ª) connected by pipe 73 with the tank 67 and in the housing 72 is located a valve 74 having a crank arm 75 provided with a lug 76 which is pressed normally against the periphery of a cam 77 by means of a spring 78, so that when the irregular portion of the cam reaches the lug 76 the valve 74 will be opened and communication established between the sucker bar 56 and the vacuum tank 67, and at this time the suckers 57 are in their lowered position against the paper, and hence take possession of it, so that when the bar 56 is again elevated the paper will be pulled outwardly or held aloof, as shown at 58 in Fig. 5, and when again released by the suckers 57 the gate 35 will have returned to its engaging position and consequently the outermost paper will fall on the outer side of the gate. The sucker bar 56 is thus elevated by a cam 79 (see Fig. 8) of suitable form engaging with an anti-friction roller or lug 80 on a fork or yoke 81 straddling the shaft 25 on which cam 79 is mounted and by which it is driven, yoke 81 having an arm 83 which is pivoted to an arm 84, secured to cranks 60, in any suitable way, as by means of screw 84ª and the two cranks 60, 84 being pivoted on the same stud 85, thereby serving to oscillate sucker bar 56 upwardly against the action of spring 65.

The cam 77 is mounted on a shaft 86 which is the same shaft which supports and rotates the cam 52, and this shaft derives motion from the shaft 25 through the intermediary of a sprocket 87 secured to shaft 25, and a chain belt or other suitable connection 88 running also over a sprocket 89 on the shaft 86, the chain belt 88 thence passing around a suitable tightener 90, thus simultaneously imparting motion to the two cams 52, 77, and operating them in unison with the feed mechanism comprising the belts 3 and the pushers 37, 38, and with the gate and sucker bar.

Figure 5:
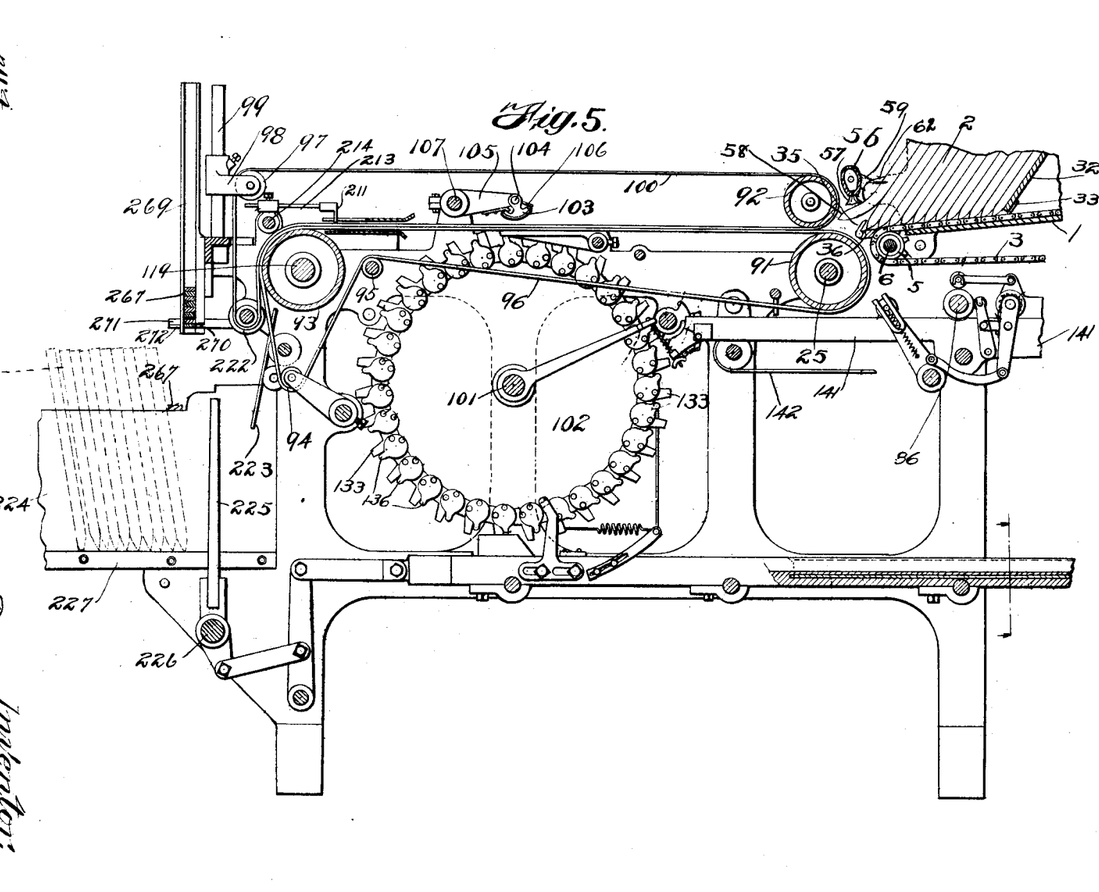
Fig. 5 is a vertical longitudinal section taken on line 5—5, Fig. 3.

The shaft 25 supports and rotates a roller 91 which projects sufficiently under the gate 35 to receive the impact of the elevated paper 58 (shown in Fig. 5 of the drawings) as it is pushed downwardly over the gate 35 by the pushers 37, 38, and as this roller is revolving toward the left, as viewed in Fig. 5, it tends to carry the paper in that direction and to encourage its entrance between the upper side of such roller and an idle roller 92 mounted close to and parallel with the roller 91, but with its axis farther along the line of movement of the paper than the axis of roller 91 and it is smaller than the latter roller so as to leave room for the operation of the sucker bar 56 and also for the edge of the paper as it is pulled outwardly thereby, thus avoiding the possibility of the paper being pushed downwardly without entering between the rollers. In the end of the frame of the machine opposite and parallel with the roller 91 is mounted roller 93 and below this a tightener roller 94, and passing over these rollers 91, 93, 94, and a guide roller 95, are a plurality of tapes 96; and arranged opposite and parallel with the roller 92 is an idle roller 97 which may be mounted in brackets 98 adjustably secured to standards 99, so that the roller 97 will also act as a tightener, and passing over the rollers 92, 97 are a number of tapes 100 which run parallel with and preferably on top of the tapes 96 and serve to begin to convey the paper horizontally from the supply in the hopper as soon as its lower edge enters between the two rollers 91, 92, and thus conduct them to the means for printing or applying the address thereto, which will not be described, but which mechanism forms the subject-matter of a separate application, filed in the U. S. Patent Office on or about June 23, 1906, Serial No. 323,015.

Figures 1, 1A:
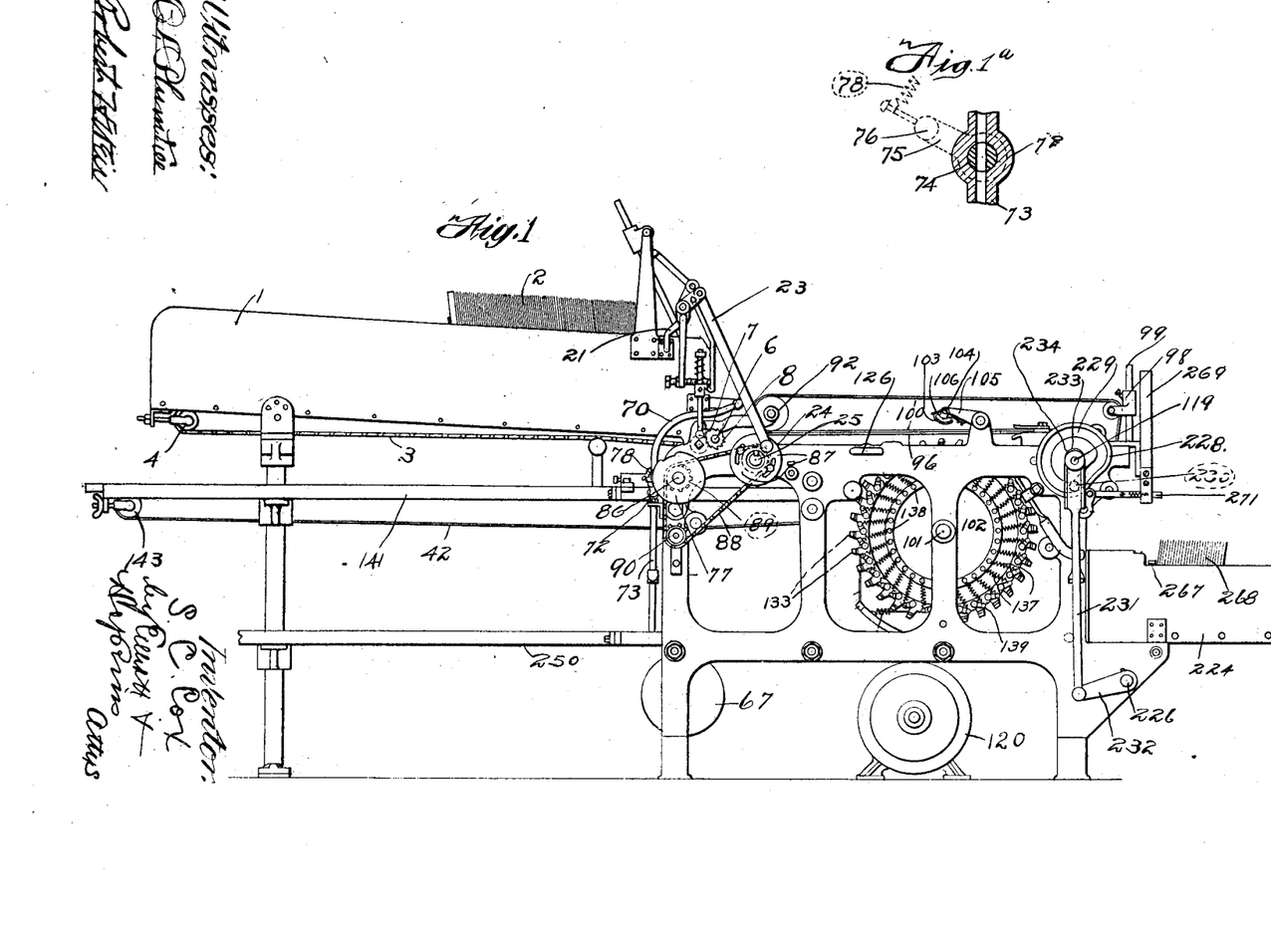
Figure 2:
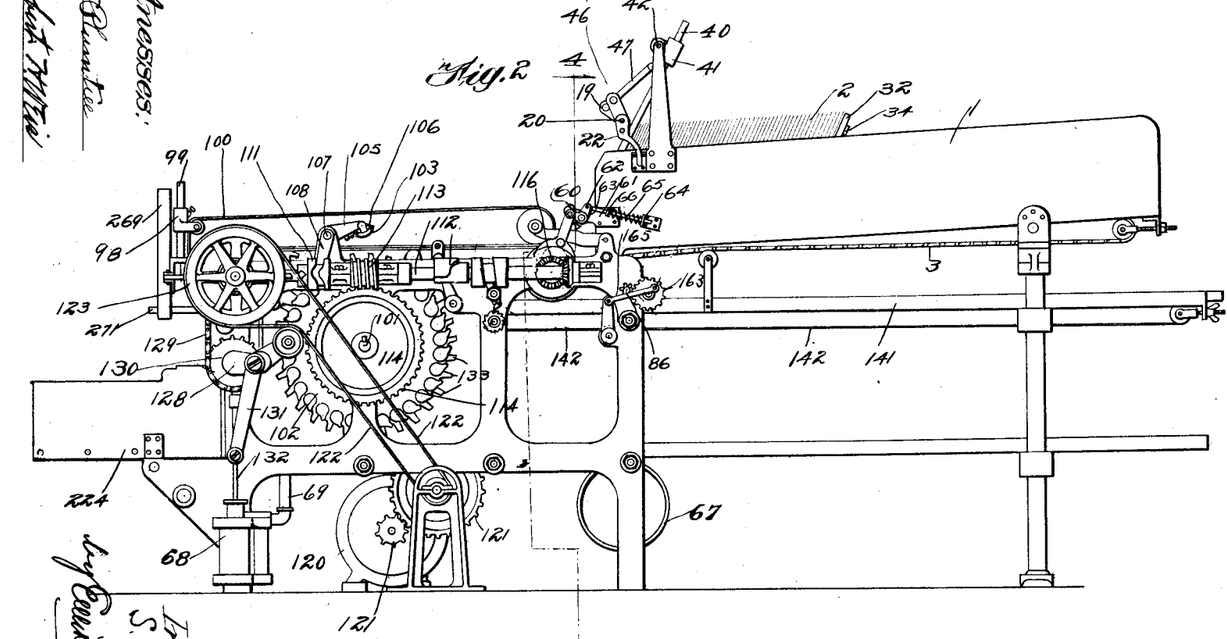
Fig. 2 is a side elevation of the opposite side of the machine presented in Fig. 1.

Secured to and mounted on a horizontal shaft 101 is a wheel or drum 102, which constitutes a holder for receiving the slugs or lines of types and carrying the same into position for impression against the paper as the latter is held between the tapes 96, 100, the wheel or drum being adapted to hold a large number of such slugs at once, but to print from them one at a time, the uppermost one, when it arrives at the position indicated in Fig. 1, being the one which is printed from and when in this position it is just below the upper fold of the lower tapes 96 and the lower fold of the upper tapes 100 and when in this position is directly under a stamper or impression device which forces the paper downwardly into contact with the previously inclined surface of the type or slug, it being understood that the tapes 96, 100 pass to either side of the drum or wheel 102. This stamper or impression device consists of a shoe 103 pivoted at 104 to a rocker arm 105 and having its lower engaging surface curved preferably on the arc which it describes around the center 104, so that, if necessary, the shoe will move in the direction of rotation of the wheel 102 while pressing the paper against the type and without blurring the printing, and to the end that the shoe 103 may return to its normal position after it releases the paper, such rotating action being produced by the frictional contact of the paper therewith, a spring 106 is provided for pressing the shoe in a direction opposite that in which the paper moves. This rocker arm 105 derives its oscillating movement at the proper time from a shaft 107 on which it is mounted and which shaft is also provided with a crank 108 having a crank pin 109 engaging in a cam groove 110 of a cam 111 which is so formed as to oscillate crank 108 when the paper arrives over the slug carrier 102 and the slug is in the proper position, and to hold the arm stationary with the shoe 103 elevated at other times. The cam 111 is mounted on a horizontal shaft 112 which serves for driving the shaft 101 at a slow rate of speed, but continuously, through the intermediary of a worm 113 on the shaft 112 and a worm gear 114 on shaft 101, and this shaft 112 also serves for driving the shaft 25 through the intermediary of miter-gears 115, 116 secured to shafts 112, 25, respectively. The shaft 112 is itself driven by miter-gears 117, 118 on shaft 112 and a main driving shaft 119, respectively, the latter shaft also serving as a means of driving the tape roller 93, and it might here be explained that the driving shaft 119 may be driven from any suitable source of power, as an electric motor 120, through the intermediary of gears 121 and belt 122, which runs over a pulley 123 constituting a part of any suitable clutch whose other member is indicated at 124 and is under the control of a shift lever 125 provided also with a handle 126 on the opposite side of the machine. The shaft 119 therefore rotates only when the clutch members 123, 124 are in engagement, but since it is desirable to keep up the vacuum in tank 67 the pump 68 may be operated continuously with the pulley 123 by a sprocket 127 secured thereto, but loose on shaft 119 and connected to a crank 128 by means of chain 129 and sprocket wheel 130, the crank being connected by pitman 131 to the piston rod 132 of the pump.

The slug or type carrier, specific construction of which forms no part of the present invention, is in the form of a drum or wheel provided around its circumference at short intervals with a plurality of slug seats in the form of radial teeth 133 so that the outer edge or printing surface projects beyond the outer end of the tooth in such a position that downward pressure against the printing surface when the slug arrives at the highest point of its travel and directly under the stamper 103 will be exerted lengthwise of the vertical axis of the slug and the radius of the drum and hence will not tend to unseat the slug. The slugs are held in position by clamping members 136 controlled by springs 137, which latter are secured at the points 138, 139, see Fig. 1. The slugs are arranged in a galley 141 conveniently arranged below the hopper and are fed therefrom by an endless conveyer 142 to the drum 102 and which conveyer receives its motion in any suitable manner. The slugs are inked as they move along the galley in any suitable manner and are ejected from the galley to the drum 102 when they reach the end of the galley.

When the slugs are delivered to the drum they are carried slowly around with the drum 102 and in the direction of movement of the paper as the latter travels between the two sets of tapes 96, 100, and as they successively arrive at a position under the stamper 103 the latter descends into contact with the paper, as above described, and produces the impression from the slug thereunder, the stamper turning on its pivot 104 in the direction of movement of the paper to accommodate the sliding movement of the drum which takes place while the stamper is performing its impression operation. It is evident, however, that since the drum travels slowly and the paper, while between the tapes and otherwise unrestrained, travels at a high rate of speed, which is desirable for getting the paper to and from the point where the impression is made with as little delay as possible, the paper must be arrested momentarily, or at least retarded, so that it cannot travel at a greater speed than the rate of rotation of the drum 102; and inasmuch as the tapes 96, 100, produce different degrees of friction on the ends of the paper, and for other causes, the paper is liable to be cut of true with one edge in advance of the other when it arrives under the stamper 103, and consequently, in addition to being retarded or stopped while the impression is being made, it is desirable to provide means for positioning it or truing it up under the stamper. The means for accomplishing these two objects constitutes no part of the present invention, but generally stated may be one and the same means, and consisting preferably of one or more gages or stops 210, 211, (Figs. 3 and 5) supported on rocker arms 212, 213, respectively, which are in turn secured to a rocker shaft 214 extending across the machine and having its end provided with an arm 215 operated by a cam 216, see Fig. 3, so formed as to elevate the gages 210, 211 and hold them elevated from the time that the stamper 103 rises until the paper has entirely cleared the gages 210, 211, when the latter again descend in readiness to arrest the next paper. This cam 216 is mounted upon and driven by the shaft 119, which, as before explained, also rotates the tape roller 93. After the address has been printed on the papers they are delivered to a receptacle and then are properly assorted as will be described.

For a clear understanding of the machine the delivery mechanism will also be described, but this part of the machine forms the subject matter of a separate application filed in the U. S. Patent Office, on or about June 11, 1906, Serial Number 321,175, patented August 22, 1911, Number 1,001,507.

When the paper leaves the stops or gages 210, 211, it is carried downwardly past the roller 93 by that portion of the belt or tape 96 which travels around the idler 94 and by one end of the set of tapes 100 which passes around an idler 222 arranged below the roller 97 and in front of the roller 93, thus delivering the paper downwardly against an upright slightly inclined rack 223 which is arranged over one end of a receiving trough 224 into which the papers slide from said rack and in which trough or receiver they are pushed forward or packed by packing arms or fingers 225 oscillating back and forth from a position behind rack 223 to a position in front thereof, as shown in Fig. 5, said fingers 225 passing through the rack 223 when moving backwardly, as will be understood, so as to allow the paper to fall in front of the fingers. The fingers 225 are oscillated in harmony with the operation of the printing mechanism to push each paper forward as described, by a rocker shaft 226 on which they are mounted below the receiver 224, the bottom of the receiver 224 being composed of slats 227 upwardly through which the fingers 225 project. The shaft 226 receives oscillation from cam 228 (Fig. 1), which is in the form of a box cam mounted on the shaft 119 and having its groove 229 so fashioned that by engaging with a lug or pin 230 on a rod 231 connected with shaft 226 by arm 232, it will hold the fingers 225 behind the rack 223 until the paper has had ample opportunity to fall into the receiver and to then throw the fingers 225 forward for pushing such paper up to its place against the others. The upper end of the rod 231 is shown with a strap 233 embracing a hub 234 on shaft 119 as a means of guiding and holding the rod in place. As the papers are deposited in the receiver 224 suitable markers for separating one batch of papers from another, as, for example, where it is desirable to indicate in the addressed papers where the papers which go to one town leave off and those which go to another town begin, are inserted between the papers by automatic mechanism operating in harmony with the printing mechanism.

Figure 3:
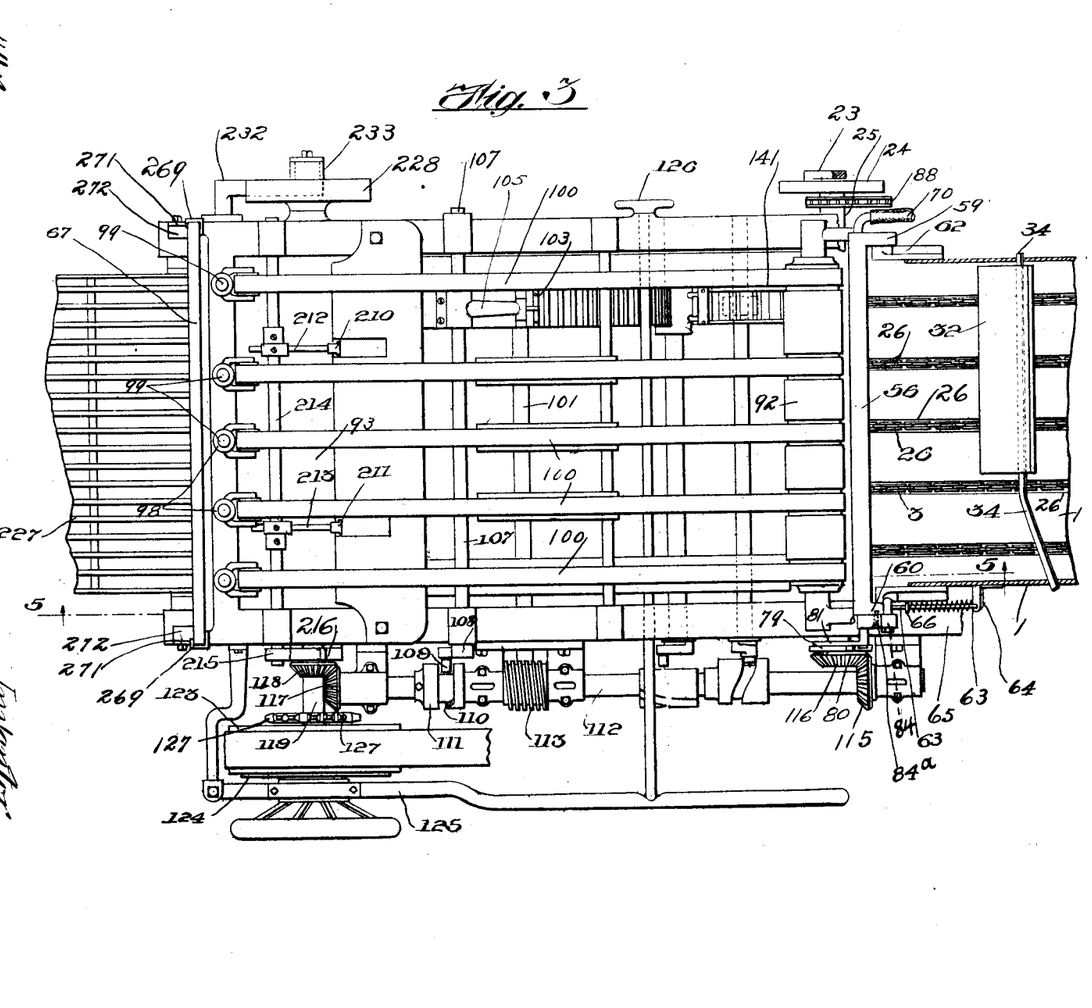
Fig. 3 is an enlarged plan view, partly broken away.

The means for depositing markers between the addressed papers for separating one batch from another will now be briefly explained for a clear understanding of the machine, but this mechanism constitutes no part of the present invention. Such markers comprise a number of slats 267 which may be of sufficient length to extend entirely across the receiver 224, as shown in Figs. 3 and 5, and of sufficient length to be supported by the sides of said receiving trough when they are released and allowed to fall, the sides of the trough being lower than the upper edges of the addressed papers contained therein, which are shown at 268, and consequently the marker or slat 267, when deposited on the edges of the trough, as shown in Fig. 5, will serve to separate one batch of papers from another and will stick out from both sides of the column of papers so that the operator may readily determine where the towns of different batches begin and terminate. These slats or markers 267 are held at their ends in a vertical column, one upon the other flatwise by suitable retainers or guides 269 in the form of vertically arranged channel bars and the lowermost one of the markers 267 is ejected from these retainers automatically by any suitable mechanism operating in harmony with the printing mechanism. For example, the lower end of each guide 269 is provided preferably at the inner side with a slot 270 in its side wall, see Fig. 5, of sufficient height to permit the lowermost marker 267 to be pushed out laterally without laterally displacing those above it, by means of ejectors 271 supported and guided transversely in the lower end of each of the retainers 269 in such a way that when these ejectors are pulled inwardly a plunger 272 on each of the ejectors will engage the outer edge of the lowermost one of the slats 267 and push it through the slots 270 in the inner sides of the retainers 269, those above the one ejected falling upon the top of the plunger 272 for the time being and eventually dropping to the bottom of the retainer 269 with the lower one opposite slot 270 when the plunger 272 returns to its outer position, as shown in Fig. 5.

Having thus described my invention, what I claim as new therein, and desire to secure by Letters Patent is:

1. In an addressing machine, the combination of a supply trough or hopper for containing a supply of folded papers, a follower therein narrower than the width of the hopper so as to stand clear of the folded ends of the papers, and means for advancing said follower to feed the papers forward.

2. In an addressing machine, the combination of a supply trough or hopper for containing a supply of folded papers, a follower therein narrower than the width of the hopper so as to stand clear of the folded ends of the papers, a support for one end of said follower bent backwardly from the papers at their folded ends so as to support the papers in the hopper with an equal degree of pressure throughout, and means for advancing said follower.

3. In an addressing machine, the combination of a supply trough or hopper, pushers for forcing the papers one by one from said trough, feed mechanism for keeping the supply of papers up to said pushers, means acting in concert with said pushers for operating said feed mechanism, a detachable connection between said means and feeding mechanism, and means acted on by the advance end of the supply of papers for throwing said connection out of action and thereby discontinuing the operation of said feeding mechanism.

4. In an addressing machine, the combination of a supply trough or hopper, pushers for forcing the papers one by one from said trough, feeding mechanism for keeping the supply up to said pushers, means acting in concert with the pushers for operating said feed mechanism, a detachable connection between said means and feed mechanism, and a deflectible gage acted on by the advance end of the supply of papers for throwing said connection out of action and thereby discontinuing the operation of said feed mechanism.

5. In an addressing machine, the combination of a supply trough or hopper, pushers for forcing the papers one by one from said trough, feed mechanism for keeping the supply up to said pushers, means acting in concert with the pushers for operating said feed mechanism, a detachable connection between said means and feed mechanism comprising a reciprocating deflectible hook operating in unison with said pushers, a lug adapted to be engaged by said hook and operatively connected with said feed mechanism for actuating the latter, means arranged to be deflected by the advancing papers, and an adjusting device between the latter means and said hook for adjusting the position of the hook with relation to said latter means.

6. In an addressing machine, the combination of a supply trough or hopper for containing a supply of papers, pushers for forcing the papers one by one from said trough, feed mechanism for keeping the supply up to said pushers comprising a follower for the papers, an endless belt to which said follower is secured, and a pawl and ratchet for driving said belt; means for actuating said pushers, a detachable operative connection between said means and pawl for imparting movement to said pawl, comprising a deflectible member or hook, a lug with which said member or hook engages and whereby said lug is moved in one direction for moving said pawl, and a spring for moving said lug in the return direction; a gage acted on by the advancing papers and an adjusting screw for adjusting said hook with relation to said gage.

7. In an addressing machine, the combination of a supply hopper for the papers, feed mechanism for urging the papers forward in said hopper comprising a pawl and ratchet by which motion is imparted thereto, an oscillatory crank arm and lug connected with said pawl, a hook pivoted to said crank arm and adapted to engage said lug, a gage arranged to be deflected by the advancing papers and an adjusting screw connected with said gage and serving as a stop for said hook to limit the movement of the hook toward the lug.

8. In a machine of the class described, the combination of means for holding a supply of papers on end, means for forcing the papers from said supply comprising means for pulling the entire lowermost edge of the outermost paper away from the others and raising the said edge toward the top of the paper, means pivotally supported adjacent the end of the first recited means from which the papers are removed and movable toward and away from the papers in the line of the feeding movement of the papers for holding the main supply when the outer paper is pulled away, said rasing means operating in concert with the said pivotally supported means and also operating to raise the lower edge of the paper over the last recited means, and means for receiving the paper thus pulled away.

9. In an addressing machine, the combination of means for holding a supply of papers on edge, means for feeding the supply forward, a gate arranged to engage the edge of the outermost paper and arrest its forward movement, means for periodically opening said gate to allow the outermost paper to pass, means for pulling the lowermost edge of the outermost paper outwardly in front of the gate and raising the entire lowermost edge away from the gate and toward the top of the paper, and means for taking away the paper thus pulled outwardly.

10. In an addressing machine, the combination of means for holding a supply of papers on edge, means for feeding the supply forward, an outwardly movable gate arranged to engage the outermost paper and arrest its forward movement, means for moving said gate into and out of engagement with the paper, means for pulling the lowermost edge of the outermost paper outwardly and raising the entire lower edge upwardly toward the upper edge of the paper, means for moving the latter means into and out of engagement with the papers alternately with the gate, and means for taking away the paper thus pulled outwardly.

11. In an addressing machine, the combination of means for holding a supply of papers on end, means for feeding the supply forward, a gate arranged to engage the lowermost edge of the outermost paper and arrest its forward movement, means for periodically opening the gate to allow said paper to pass, means for pulling the said lowermost edge of the paper outwardly in front of the gate and for raising the entire lowermost edge upwardly toward the upper edge of the paper, means for pushing said paper across said gate after the latter again closes against the supply, and means for taking said paper away from the gate.

12. In an addressing machine, the combination of means for holding a supply of papers on end, means for feeding the supply forward, a gate arranged to engage the lowermost edge of the outermost paper and arrest its forward movement, means for periodically opening said gate to allow said paper to pass, means for pulling the said edge of the paper outwardly in front of the gate and for raising the entire lowermost edge upwardly toward the upper edge of the paper, means for pushing the outermost paper across said gate after the latter closes against the supply, and feed rollers arranged to receive said paper from said pushers.

13. In an addressing machine, the combination of means for holding a supply of papers on end, means for feeding the supply forward, a gate arranged to engage the lowermost edge of the outermost paper, means for moving the said gate outwardly to allow the paper to pass and then moving it in again to retain the supply, a pneumatic sucker, means for moving said sucker toward and from the outermost paper and into engagement therewith for pulling the lowermost edge of said paper outwardly in front of the gate and for raising the entire said edge upwardly toward the upper end of the paper, an air exhauster connected with said sucker for producing a partial vacuum therein, a valve for relieving said vacuum, means for opening said valve when the gate moves inward against the supply, and means for removing the paper pulled outward by the sucker.

14. In an addressing machine, the combination of means for holding a supply of papers on end, means for feeding the supply forward, a gate arranged to engage the lowermost edge of the outermost paper, means for moving the gate outward to allow said edge to pass and then moving it in again to retain the supply, an oscillatory sucker, means for moving said sucker toward and from the said outer edge of the outermost paper and into engagement therewith for pulling said lowermost edge in front of the gate and raising the entire lowermost edge upwardly toward the upper edge of the paper, an air exhauster connected with said sucker for producing a partial vacuum therein, a valve for relieving said vacuum, means for opening said valve when the gate reëngages the supply, and means for removing the paper pulled outwardly by the sucker.

15. In an addressing machine, the combination of a supply trough or hopper for containing a supply of folded papers placed on end with the folded or doubled edges adjacent one side of the hopper, means for supporting the rear end of the supply of papers, and means for advancing the last said means to feed the papers forward, the first said means being adapted to hold the body portion of the papers more compactly than the folded edges.

16. In an addressing machine, the combination of means for holding a supply of papers on edge, means for feeding the supply forward, a gate arranged to engage the edge of the outermost paper and arrest its forward movement, said gate being supported for operation in the line of the feeding movement of the papers, means for periodically opening said gate to allow the outermost paper to pass, and means for pulling the lowermost edge of the outermost paper outwardly in front of the gate and raising the entire lowermost edge away from the gate and toward the top of the paper.

SANDFORD C. COX.

Witnesses:
F. A. HOPKINS,
M. B. ALLSTADT.

---

Copies of this patent may be obtained for five cents each, by addressing the "Commissioner of Patents, Washington, D. C."